(12) United States Patent
Ninoyu et al.

(10) Patent No.: US 8,215,721 B2
(45) Date of Patent: Jul. 10, 2012

(54) PARKING BRAKE CONTROL DEVICE

(75) Inventors: Masaki Ninoyu, Obu (JP); Kazuma Kondo, Aichi-gun (JP); Takashi Watanabe, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 711 days.

(21) Appl. No.: 12/369,354

(22) Filed: Feb. 11, 2009

(65) Prior Publication Data
US 2009/0206650 A1    Aug. 20, 2009

(30) Foreign Application Priority Data
Feb. 14, 2008   (JP) .................................. 2008-033120

(51) Int. Cl.
*B60T 13/74*   (2006.01)

(52) U.S. Cl. ................ 303/3; 303/20; 303/89; 188/156; 701/70

(58) Field of Classification Search ................ 303/3, 15, 303/20, 89; 188/2 D, 156–164; 701/1, 70, 701/50, 99
See application file for complete search history.

(56) References Cited

U.S. PATENT DOCUMENTS

| | | | |
|---|---|---|---|
| 6,249,737 B1 | 6/2001 | Zipp | |
| 6,609,595 B2 * | 8/2003 | Flynn et al. | 188/156 |
| 6,978,870 B2 * | 12/2005 | Powrozek et al. | 188/156 |
| 7,444,226 B2 * | 10/2008 | Marenco | 701/99 |
| 7,881,849 B2 * | 2/2011 | Shiraki | 701/70 |
| 7,971,488 B2 * | 7/2011 | Sturzer | 73/760 |
| 8,007,055 B2 * | 8/2011 | Leiter | 303/122.03 |
| 2007/0240947 A1 * | 10/2007 | Goss et al. | 188/158 |
| 2008/0185235 A1 * | 8/2008 | Suzuki | 188/1.11 E |

FOREIGN PATENT DOCUMENTS
JP    2001-514597 A    9/2001
* cited by examiner

*Primary Examiner* — Pamela Rodriguez
(74) *Attorney, Agent, or Firm* — Buchanan Ingersoll & Rooney PC

(57) ABSTRACT

The parking brake control device sets a lock control target tension TTAR to a value which depends on the brake fluid pressure (i.e. M/C pressure), wherein the lock control target tension TTAR is used as a threshold determining whether the condition for terminating a lock control is satisfied or not. This operation is aimed for compensating the decrease of the tension applied to the brake cable which occurs caused by the service brake when the service brake is operating and does not occur when the service brake is not operating. Therefore, it is possible to prevent the service brake from causing a problem in which the lock control is terminated while a desired brake force is not achieved at the EPB.

15 Claims, 11 Drawing Sheets

PARKING BRAKE CONTROL DEVICE

CROSS REFERENCE TO RELATED APPLICATION

This application is based on and incorporates herein by reference Japanese patent applications No. 2008-033120 filed on Feb. 14, 2008.

FIELD OF THE INVENTION

The present invention relates to a parking brake control device for executing a lock/release control of an electric parking brake (hereinafter referred to as EPB).

BACKGROUND OF THE INVENTION

Conventionally, a parking brake is used for restricting movement of a parked vehicle. For example, a manual parking brake is used in which an operation force applied to an operation lever is transmitted to a brake mechanism of the parking brake when the operation lever pulls a brake cable caused by the operation force. An electrically driven parking brake is also used in which a rotational force of a motor is transmitted to the brake mechanism of the parking brake.

In the electrically driven parking brake (i.e. EPB), a brake force is generated when, for example, a rotational force of a motor pulls a brake cable and the tension of the brake cable is thereby transmitted to the brake mechanism (i.e. actuator). In a lock control of the EPB, the parking brake control device rotates the motor in a lock side direction (i.e. forward direction) to transmit the rotational force of the motor to the brake mechanism (i.e. actuator) and stops the rotation of the motor with the brake force remained. In a release control, the parking brake control device rotates the motor in a release side direction (i.e. reverse direction) to remove the brake force.

Thus, the lock/release control includes the lock control and the release control. In the lock control, the parking brake control device keeps the EPB locked at a desired force by stopping the rotation of the motor in the lock side direction when the tension applied to the brake cable reaches a target value. In the release control, the parking brake control device detects that the brake force is removed by detecting that the tension of the brake cable becomes approximately zero. See Japanese Patent Application Publication No. 2001-514597 (U.S. Pat. No. 6,249,737).

SUMMARY OF THE INVENTION

However, in the built-in brake in which the EPB and a service brake commonly use an actuator, the actuator is under influence of the status of operation of the service brake, that is, the actuator is under influence of a brake hydraulic pressure. The influence changes the relation between the tension applied to the brake cable and a desired brake force, wherein the tension is detected by a tension sensor and the desired brake force is a force required to be generated at the EPB. This causes some problems in one of which the brake cable is pulled to an extent which is excessive for generating the desired brake force.

In addition, an extra pull control may be executed in which the brake force is adjusted so that the EPB is kept locked. More specifically, the brake cable is further pulled in the extra pull control so that the tension applied to the brake cable reaches the target value again when the tension gets lower than the target value. However, the service brake may cause the tension applied to the cable to be decreased, and the extra pull control may accordingly be executed even if the extra pull control is unnecessary.

In the above description, the EPB uses the brake cable to transmit the rotational force of the motor to the brake mechanism. However, the EPB is not restricted to ones which use a brake cable to transmit the rotational force of the motor to the brake mechanism. For example, the EPB may generate a hydraulic pressure by pressing a hydraulic piston with the rotational force of the motor and may press brake pads or brake shoes with the generated hydraulic pressure. The EPB of this type also has a problem similar to that of the EPB using the brake cable. The EPB of this type which does not use a brake cable generates a pressing force for moving a friction material such as a brake pad and a brake shoe by rotating the electrical motor installed to the EPB. Then the pressing force generates the brake force. In this type of EPB, the parking brake control device can detect the pressing force for moving the friction material and terminate the release control when the detected pressing force is decreased to a target value at which the brake force caused by the EPB is supposed to be removed. By executing this type of control, the problem occurs which is similar to one described for the EPB using the brake cable. Even in the case that the EPB uses a brake cable, it is possible to execute the lock/release control based on the pressing force for moving the friction material and not based on the tension applied to the brake cable. In this case, the problem also occurs which is similar to one described for the EPB using the brake cable.

It is therefore an object of the present invention to provide a parking brake control device used in a situation where an EPB and a service brake commonly use an actuator, wherein the parking brake control device makes it possible to prevent the service brake from causing a lock control to be terminated when a desired brake force is not generated.

It is another object of the present invention to provide a parking brake control device used in a situation where an EPB and a service brake commonly use an actuator, wherein the parking brake control device makes it possible to prevent the service brake from causing a brake force adjustment control to be executed when the brake force adjustment control is not necessary, wherein the brake force adjustment control is for adjusting the braking force to keep the EPB locked In an aspect of the present invention, a parking brake control device includes a lock control section for executing a lock control, the lock control being for: generating the brake force by rotating the electric motor in the first direction and by accordingly generating the pressing force; then stopping the rotation of the motor when a termination condition is satisfied wherein the termination condition is that the pressing force reaches a target value for stopping the rotation of the motor; and then maintaining the brake force to keep the electric parking brake locked, wherein the lock control section includes a target value determination section for determining the target value so that the target value becomes smaller in the case that the service brake is operating than in the case that the service brake is not operating.

As described above, the parking brake control device sets the target value to a value which becomes smaller in the case that the service brake is operating than in the case that the service brake is not operating, wherein the lock control target tension TTAR is used as a threshold determining whether a condition for terminating the lock control is satisfied or not. This operation is aimed for compensating the influence of the service brake, that is, for compensating the decrease of the pressing force in the case that the service brake is operating from the pressing force in the case that the service brake is not operating. Therefore, it is possible to prevent the service brake from causing a lock control to be terminated when a desired brake force is not generated.

The target value determination section may detect, in determining the target value, a physical quantity corresponding to the pressing force for moving the first friction material toward the second friction material and determines the target value so that the target value becomes smaller as the physical quantity becomes larger. In this case, the target value determination section uses a brake fluid pressure as the physical quantity.

The parking brake control device may further include an adjustment control section for: calculating, while the electric parking brake is being locked by the lock control section, decrease of the pressing force from the target value and increase the pressing force by rotating the electric motor in the first direction when the calculated decrease becomes larger than a threshold, wherein the adjustment control section includes a threshold determination section for determining the threshold so that the threshold becomes larger in the case that the service brake is operating than in the case that the service brake is not operating.

Thus, the parking brake control device may set the threshold to a value which becomes larger in the case that the service brake is operating than in the case that the service brake is not operating, wherein the threshold is used for determining whether the pressing force should be adjusted or not. This operation is aimed for compensating the influence of the service brake, that is, for compensating the decrease of the pressing force in the case that the service brake is operating from the pressing force in the case that the service brake is not operating. Therefore, it is possible to prevent the service brake from causing a brake force adjustment control to be executed when the brake force adjustment control is not necessary, wherein the brake force adjustment control is for adjusting the braking force to keep the EPB locked The threshold determination section may detect, in determining the threshold, a physical quantity corresponding to the pressing force for moving the first friction material toward the second friction material and determines the target value so that the threshold becomes larger as the physical quantity becomes larger. In this case, the threshold determination section may use a brake fluid pressure as the physical quantity corresponding to the pressing force for moving the first friction material toward the second friction material.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
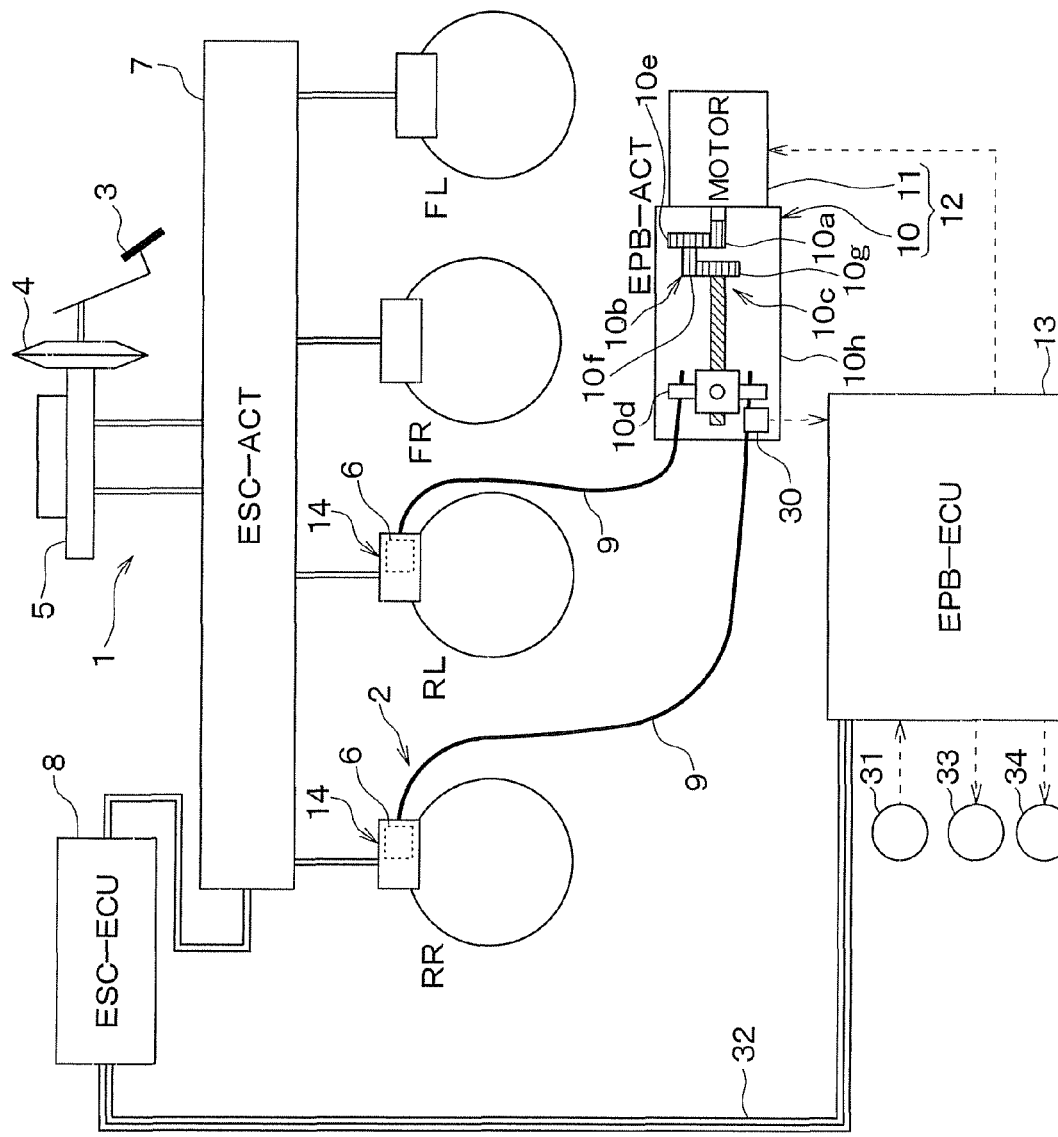
FIG. 1 is a schematic figure showing an overall structure of a vehicular brake system including a parking brake control device according to a first embodiment of the present invention.

Hereinafter, embodiments of the present invention are described with reference to the above figures. Note that elements that are the same or equivalent to each other in the following embodiments are denoted with the same reference numeral in the appended drawings.

First Embodiment

Hereinafter, a first embodiment is described. FIG. 1 is a schematic figure showing an overall structure of a vehicular brake system including a parking brake control device according to the present embodiment.

As shown in FIG. 1, the brake system includes a service brake 1 and an EPB 2. The service brake 1 generates a brake force based on a pedaling force of a driver (i.e., a force applied to a brake pedal by a driver's foot). The EPB 2 is for restricting movement of a vehicle while the vehicle is parked.

In the service brake 1, a brake booster 4 boosts the pedaling force caused by pedaling action of the driver. The service brake 1 generates a brake fluid pressure in a master cylinder 5 based on the boosted pedaling force and transmits the brake fluid pressure to a wheel cylinder (hereinafter referred to as W/C) 6 for each of wheels of the vehicle in order to generate a braking force. An actuator 7 for controlling brake fluid pressure is installed between the master cylinder 5 and each of the W/Cs 6. By using the actuator 7, the service brake 1 can adjust the brake force generated by the service brake 1 and execute various types of control (e.g. anti-skid control) for improving the safety of the vehicle.

More specifically, the various types of control in which the actuator 7 is used are executed by an ESC-ECU 8. For example, the ESC-ECU 8 outputs a control current for controlling various types of control valves (not illustrated) and motors (not illustrated) for driving pumps (not illustrated) in order to control a hydraulic circuit installed to the actuator 7 and accordingly control the W/C pressures transmitted to the W/Cs 6. Thus, the ESC-ECU 8 can prevent the wheels from slipping and accordingly improve the safety of the vehicle. An M/C pressure sensor (not illustrated) for detecting the pressure at the master cylinder 5 is also installed to the actuator 7. A detection signal from the M/C pressure sensor is inputted to the ESC-ECU 8 so that the actuator 7 detects the state of operation of the service brake 1.

On the other hand, the EPB 2 includes an EPB actuator 12 having brake cables 9, a gear mechanism 10, and an electric motor 11, and also includes an EPB control device (hereinafter referred to as an EPB-ECU) 13. The EPB 2 generates a brake force by using the W/Cs 6 which are also used by the service brake 1. Thus, the W/Cs 6 are shared by the EPB 2 and the service brake 1.

Figure 2A:
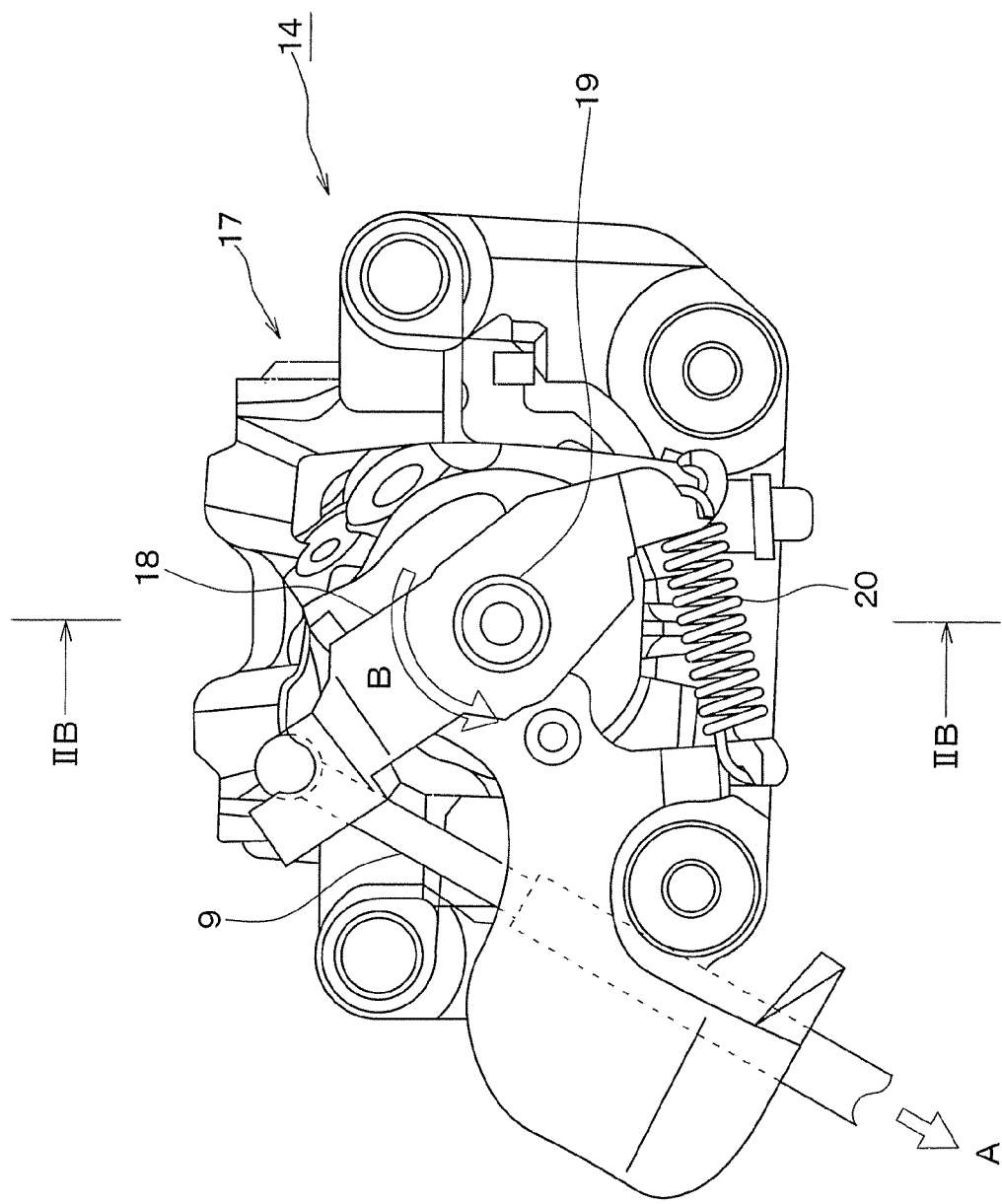
FIG. 2A is a side view showing a built-in brake system.
Figure 2B:
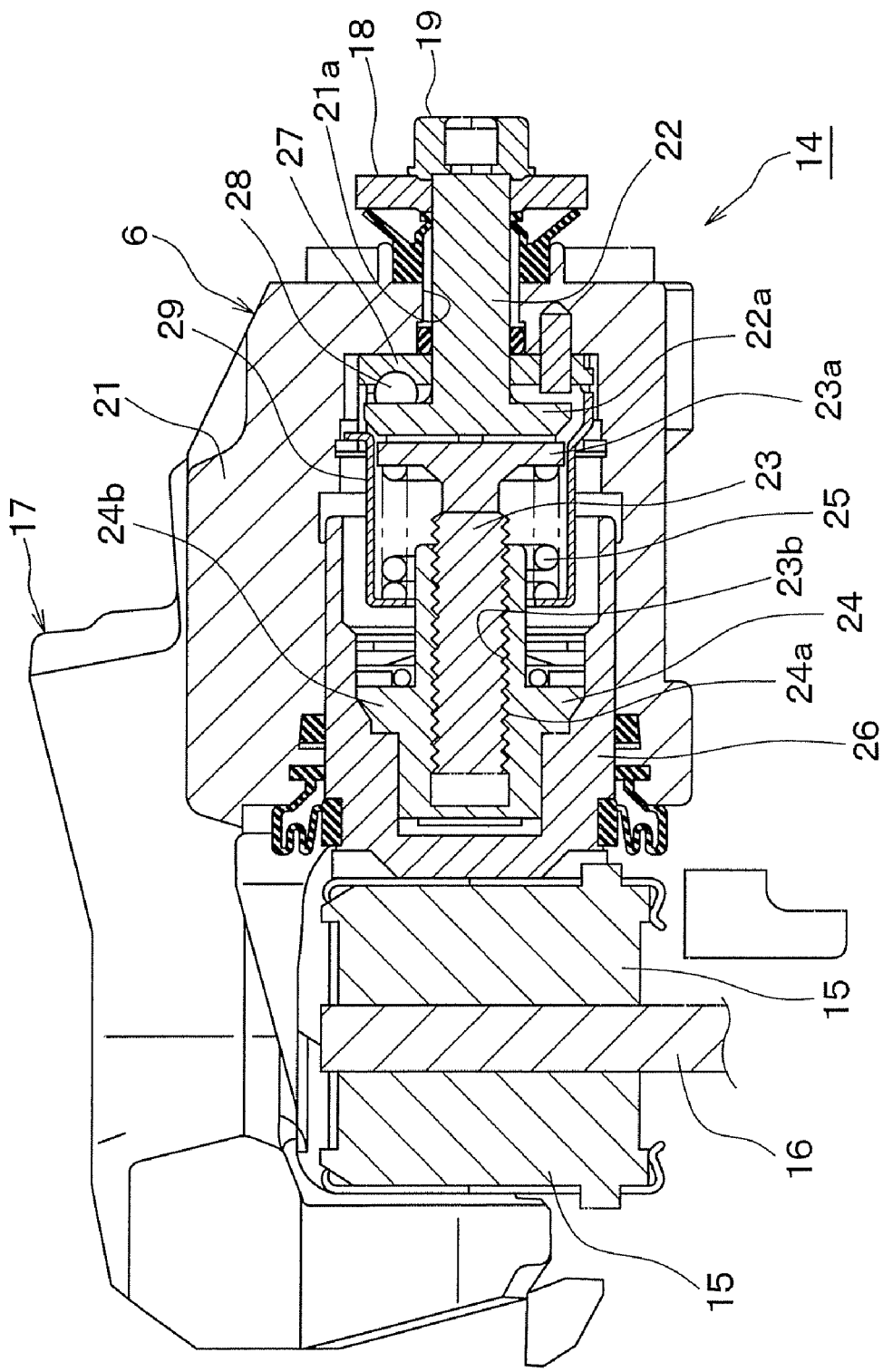
FIG. 2B is a cross-sectional view taken along the IIB-IIB line in FIG. 2A showing a detailed structure of the built-in brake system.

In the present embodiment, a structure in which the service brake 1 and the EPB 2 share the W/Cs 6 for generating the brake force is used as a built-in brake system 14. FIG. 2A is a side view showing the built-in brake system 14. FIG. 2B is a cross-sectional view taken along the IIB-IIB line in FIG. 2A and shows a detailed structure of the built-in brake system 14. Hereinafter, the detailed structure of the built-in brake system 14 is described with reference to FIGS. 2A and 2B.

The built-in brake system 14 presses a brake pad 15 by using one of the W/Cs 6 so that a brake disc 16 is pressed from its both sides by the brake pad 15 not only when the service brake 1 operates but also when the EPB 2 operates. Thus, the built-in brake system 14 generates the brake force as a friction force between the brake pad 15 and the brake disc 16 not only when the service brake 1 operates but also when the EPB 2 operates.

As shown in FIG. 2A, the built-in brake system 14 causes the EPB 2 to generate the brake force by causing the brake cable 9 to pull a caliper lever 18 installed to an end portion of a caliper 17 and generating a hydraulic pressure in the W/C 6 (see FIGS. 1 and 2B) installed in the caliper 17. More specifically, the caliper lever 18 is constructed so that it can rotate around a nut 19. An end of the brake cable 9 is fixed to an end of the caliper lever 18, and a return spring 20 is fixed to the other end of the caliper lever 18. The caliper lever 18 is brought back to its initial position by a spring force (an elastic force) of the return spring 20 when the brake cable 9 is not pulled. The caliper lever 18 is rotated in a direction shown by an arrow B in FIG. 2A against the spring force of the return spring 20 when the brake cable 9 is pulled in the direction shown by an arrow A.

The brake pad 15 is incorporated in the caliper 17 and presses both sides of a portion of an outer part of the brake disc 16. The W/C 6 includes in its cylinder portion 21a ramp shaft 22, a push rod 23, a nut 24, a return spring 25, and a piston 26.

A portion of the ramp shaft 22 is inserted into an insertion hole 21a located at the cylinder portion 21 and an end of the ramp shaft 22 is thereby connected with the caliper lever 18. The ramp shaft 22 therefore is rotated in accordance with the rotation of the caliper lever 18 when the caliper lever 18 is rotated around a center axis of the nut 19.

A flange portion 22a is formed at another end of the ramp shaft 22 which is opposite to the end of the ramp shaft 22 connected with the caliper lever 18. At a surface of the cylinder portion 21 opposite to the flange portion 22a, a ball bearing portion 27 is formed as a counterpart of the flange portion 22a. A ramp channel (not illustrated) is formed on at least one of a surface (hereinafter referred to as a first surface) of the ball bearing portion 27 and a surface (hereinafter referred to as a second surface) of the flange portion 22a which are opposed to each other. A ball 28 is located on the ramp channel. The ramp channel is a sloping channel the depth of which gradually changes along a circumferential direction around the center axis (i.e. axis of rotation) of the ramp shaft 22. Therefore, when the ramp shaft 22 is rotated along with the caliper lever 18, the flange portion 22a is also rotated and the ramp channel formed on the flange portion 22a and/or the ball bearing portion 27 is rotated relative to one of the first and second surfaces which the ramp channel itself is not on. Accordingly, the ramp of the ramp channel causes the ramp shaft 22 to move along the center axis of the ramp shaft 22.

The push rod 23 is in contact with the end of the ramp shaft 22 where the flange portion 22a is formed. Therefore, when the ramp shaft 22 is moved toward the brake pad 15, a pressing force is applied from the ramp shaft 22 to the push rod 23 and the push rod 23 is moved toward the brake pad 15 along with the ramp shaft 22. The push rod 23 is constructed so that it can get apart from and come in touch with the ramp shaft 22 and can move toward the brake pad 15 apart from the ramp shaft 22 when the service brake 1 operates.

In addition, a flange portion 23a is formed at the end of the push rod 23 closer to the ramp shaft 22, and the spring force of the return spring 25 is applied to the flange portion 23a. The return spring 25 is supported by a spring bearing 29 fixed to the cylinder portion 21. Accordingly, the return spring 25 extends and contracts at the position between the spring bearing 29 and the flange portion 23a of the push rod 23 and applies the spring force to the flange portion 23a to bias the flange portion 23a toward the ramp shaft 22. Therefore, the push rod 23 is biased toward the ramp shaft 22 by the spring force of the return spring 25 when a pressing force toward the brake pad 15 is not applied to the push rod 23.

An external thread 23b is formed on the outer circumstance of the push rod 23 and is screwed into an internal thread 24a which is formed on the internal wall surface of the nut 24. Therefore, when the push rod 23 is moved toward the brake pad 15, the nut 24 is also moved toward the brake pad 15 by a friction force between the external thread 23b formed on the outer circumstance of the push rod 23 and the internal thread 24a formed on the inner wall surface of the nut 24.

Furthermore, a flange portion 24b is formed at the outer circumstance of the nut 24. A part of the nut 24 which is closer to the brake pad 15 than the flange portion 24b is fixed at a hollow portion of the piston 26 by press fitting so that the nut 24 and the piston 26 are combined together as a single body. Therefore, the piston 26 is moved toward the brake pad 15 as the nut 24 is moved toward the brake pad 15. A pressure injection hole (not illustrated) is formed at a position between the flange portion 23a of the push rod 23 and flange portion 24b of the nut 24. Through the pressure injection hole, a hydraulic pressure is transmitted as the W/C pressure when the hydraulic pressure is under control for increasing the M/C pressure (i.e. pressure at the master cylinder 5) or improving the safety of the vehicle. When the W/C pressure is applied to the flange portion 24b, the nut 24 and piston 26 are moved toward the brake pad 15.

As described above, when the service brake 1 of the built-in brake system 14 operates, the W/C pressure is applied to the flange portion 24b of the nut 24 and the piston 26 is accordingly moved to press the brake pad 15. On the other hand, when the EPB 2 of the built-in brake system 14 operates, the brake cable 9 is pulled and the ramp shaft 22 is accordingly used to cause the push rod 23, the nut 24, and the piston 26 to move and press the brake pad 15. Thus, the built-in brake system 14 causes the W/C 6 to press the brake pad 15 when any one of the service brake 1 and EPB 2 operates. Therefore, it is possible to generate the brake force as a friction force which is generated when the brake disc 16 is pressed at its both sides by the brake pad 15. In the present embodiment, the ramp shaft 22 in the built-in brake system 14 serves as an example of a member for generating the pressing force for moving the piston 26 of the W/C 6 in the operation of the EPB 2. The tension of the cable 9 is detected as a force corresponding to this pressing force.

The gear mechanism 10 includes an input gear 10a, a reduction gear 10b, an output shaft 10c, and a drive nut 10d. The input gear 10a is installed to the shaft of the motor 11 and receives the rotational force generated by the motor 11. The reduction gear 10b includes a first spur gear 10e and a second spur gear 10f. The first spur gear 10e is engaged to the input gear 10a. The second spur gear 10f is located coaxially with the rotation axis of the first spur gear 10e and the number of the teeth of the second spur gear 10f is smaller than that of the first spur gear 10e. The output shaft 10c is a drive screw having an external thread. The output shaft 10c has at its one end a third spur gear 10g which is engaged to the second spur gear 10f of the reduction gear 10b. The output shaft 10c is rotated coaxially with the third spur gear 10g when the motor 11 drives the third spur gear 10g by means of the reduction gear 10b. The drive nut 10d moves in a linear direction parallel to the output shaft 10c while being supported by a guide member (not illustrated) mounted in a gear box 10h accommodating the gear mechanism 10. Each brake cable 9 is connected with the drive nut 10d. Therefore, each brake cable 9 is sometimes stretched and is sometimes loosened as the drive nut 10d is moved along the output shaft 10c.

In the gear mechanism 10, rotation of the gears is stopped at the time when the motor 11 is stopped. At this time, the brake cable 9 holds its status under the friction force generated by engagement between the output shaft 10c and the drive nut 10d. Therefore, the brake force is generated in the parking brake mechanism when the rotation of the motor 11 stretches the brake cable 9, and the brake force is maintained when the rotation of the motor 11 is stopped.

The gear mechanism 10 also includes a tension sensor 30 for detecting the tension of the brake cables 9. The tension sensor 30 includes, for example, a spring (not illustrated) which shrinks as the tension of the brake cable 9 gets larger. The tension sensor 30 thus detects the tension of the brake cables 9 by generating a detection signal corresponding to the degree of shrink of the spring. The EPB-ECU 13 detects the tension of the brake cables 9 when the detection signal from the tension sensor 30 is inputted to the EPB-ECU 13.

The EPB-ECU 13 includes a well-known microcomputer having a CPU, a ROM, a RAM, and an I/O and executes a parking brake control by controlling the rotation of the motor 11 according to a program stored in the ROM or the like. The EPB-ECU 13 serves as an example of a parking brake control device of the present invention. For example, the EPB-ECU 13 receives a signal based on an operation state on how an operation switch (hereinafter referred to as SW) 31 is operated, wherein the SW 13 is mounted in the instrument panel (not illustrated) in the passenger's compartment of the vehicle. The EPB-ECU 13 also receives information related to the M/C pressure from the ESC-ECU 8 through an in-vehicle LAN 32. The EPB-ECU 13 then drives the motor 11 based on the operation state of the SW 31 and the M/C pressure. In addition, the EPB-ECU 13 outputs, based on the status of operation of the motor 11, signals indicating whether the operation status is "locking" or "releasing" to a lock/release indicator lamp 33 mounted in the instrument panel. Moreover, the EPB-ECU 13 outputs a signal indicating malfunction of the EPB 2 to a malfunction indicator lamp 34 when the EPB 2 is malfunctioning.

More specifically, the EPB-ECU 13 includes several function sections for executing a lock/release control. The lock/release control includes tension detection, target value calculation, determination, motor driving, and operation determination. In the tension detection, the EPB-ECU 13 detects, based on the detection signal from the tension sensor 30, the tension applied to the brake cable 9. In the target value calculation, the EPB-ECU 13 calculates a lock control target value TSLT in terminating a lock control. In the determination, the EPB-ECU 13 sometimes determinates whether or not the generated tension reaches a target tension value and sometimes determinates whether or not generated tension reaches zero. In the driving, the EPB-ECU 13 controls the motor 11 based on the operation status of the SW31 in order to control the status of operation of the EPB actuator 12. In the operation determination, the EPB-ECU 13 determinates the status of operation of the service brake 1 based on the M/C pressure. The EPB-ECU 13 controls locking and releasing the EPB 2 by rotating the motor 11 in the forward direction and reverse direction and stopping the rotation of the motor 11 based on the operation state of the SW 31 and the tension applied to the brake cable 9. Thus, the brake system according to the present embodiment is constructed.

Figure 3:
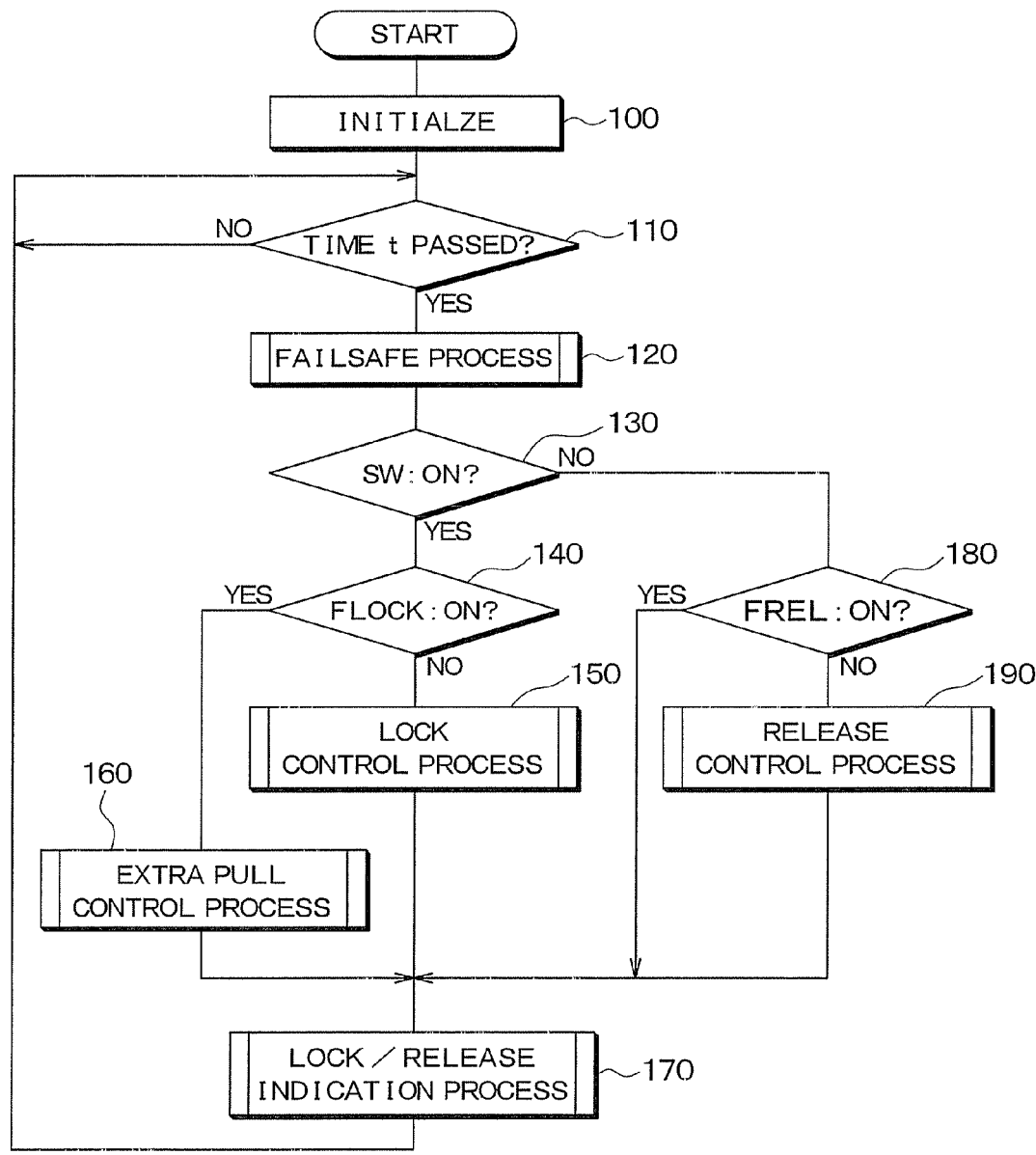
FIG. 3 is a flowchart showing details of a process for the parking brake control.

Next, a parking brake control is described which the EPB-ECU 13 executes according to the several function sections described above and a program stored in the ROM (not illustrated) installed in the EPB-ECU 13. FIG. 3 is a flowchart showing details of the process for the parking brake control.

First, the EPB-ECU 13 executes at step 100 an ordinary initialization process such as resetting time counters for measuring time and flags. Then the EPB-ECU 13 proceeds to step 110 and determines whether or not a time period t has passed. The time period t defines a period between two neighboring control cycles. More specifically, the EPB-ECU 13 repeats the determination process at step 110 until the time period t passes since the initialization process is completed or since the determination at step 110 in the previous control cycle becomes affirmative. Thus, a cycle of the parking brake control is executed every time the time period t passes.

Figure 4:
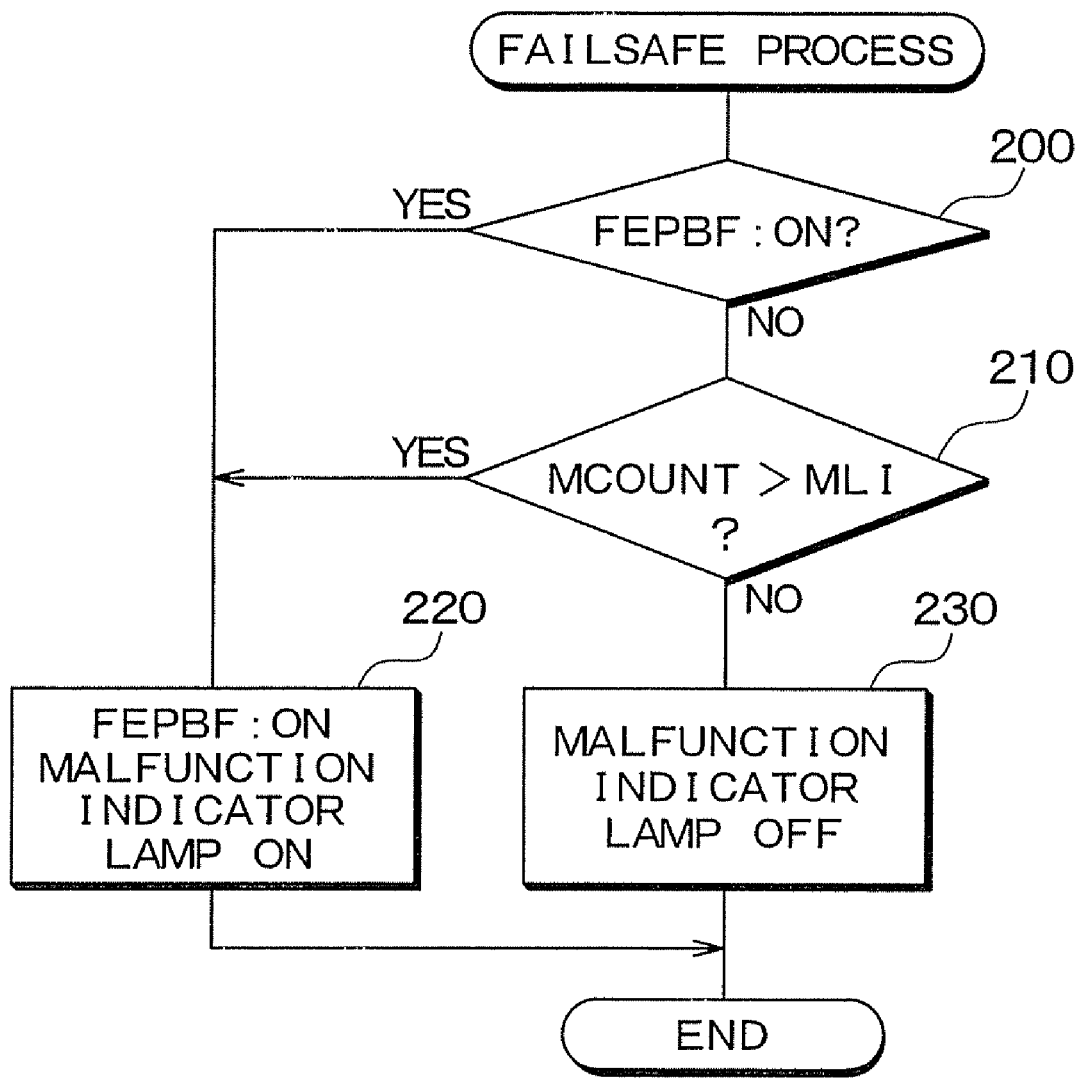
FIG. 4 is a flowchart showing details of a failsafe control.

When the determination at step 110 becomes affirmative, the EPB-ECU 13 proceeds to step 120 to execute a failsafe process. FIG. 4 is a flowchart showing details of the failsafe process. On starting the failsafe process, the EPB-ECU 13 determines whether or not an EPB malfunction flag FEPBF is ON at step 200.

If the determination at step 200 is negative, the EPB-ECU 13 proceeds to step 210 to determine whether or not an extra pull number counter MCOUNT is larger than an extra pull acceptable number MLI. The extra pull number counter MCOUNT is a counter for measuring how many times an extra pull control described later is completed. Hereinafter, pulling of the brake cable 9 once in the extra pull control is referred to as extra pull. The extra pull acceptable number MLI is a number which is possible and therefore acceptable as the number indicating how many times the extra pull control is completed. It is likely that the extra pull control is completed extraordinary times in the case that the extra pull number counter MCOUNT is larger than the extra pull acceptable number MLI. If the determination at step 210 is negative, the EPB-ECU 13 therefore proceeds to step 230 to turn off the malfunction indicator lamp 34 so as to indicate that no fault is occurring, and then terminates the failsafe control in the present control cycle. If the determination at the step 200 or 210 becomes affirmative, the EPB-ECU 13 proceeds to step 220 to turn on the malfunction indicator lamp 34 and turn the EPB malfunction flag FEPBF to ON. It should be noted that the EPB malfunction flag FEPBF is kept ON and the malfunction indicator lamp 34 is kept on if the EPB malfunction flag FEPBF is already on at step 200. Then the present cycle of the failsafe process is completed.

Then, the EPB-ECU 13 proceeds to step 130 to determine whether or not the SW 31 is ON. When the SW 31 is ON, it is likely that the driver is activating the EPB 2 to put the EPB 2 into the locked state. When the SW 31 is OFF, it is likely that the driver is putting the EPB 2 to the released state. Therefore, if the determination at step 130 is affirmative, the EPB-ECU 13 proceeds to step 140 to determine whether or not a lock state flag FLOCK is on. The lock state flag FLOCK is a flag which is turned to ON when the EPB 2 is activated and put into the locked state. Therefore, the EPB 2 has finished its operation and a required brake force has been already generated at the time when the lock state flag FLOCK is ON. Accordingly, the EPB-ECU 13 proceeds to step 150 to execute a lock control process if the determination at step 140 is negative. If the determination at step 140 is affirmative, the EPB-ECU 13 proceeds to step 160 to execute an extra pull control process. When the lock control process or the extra pull control process is finished, the EPB-ECU 13 proceeds to step 170.

Figure 5:
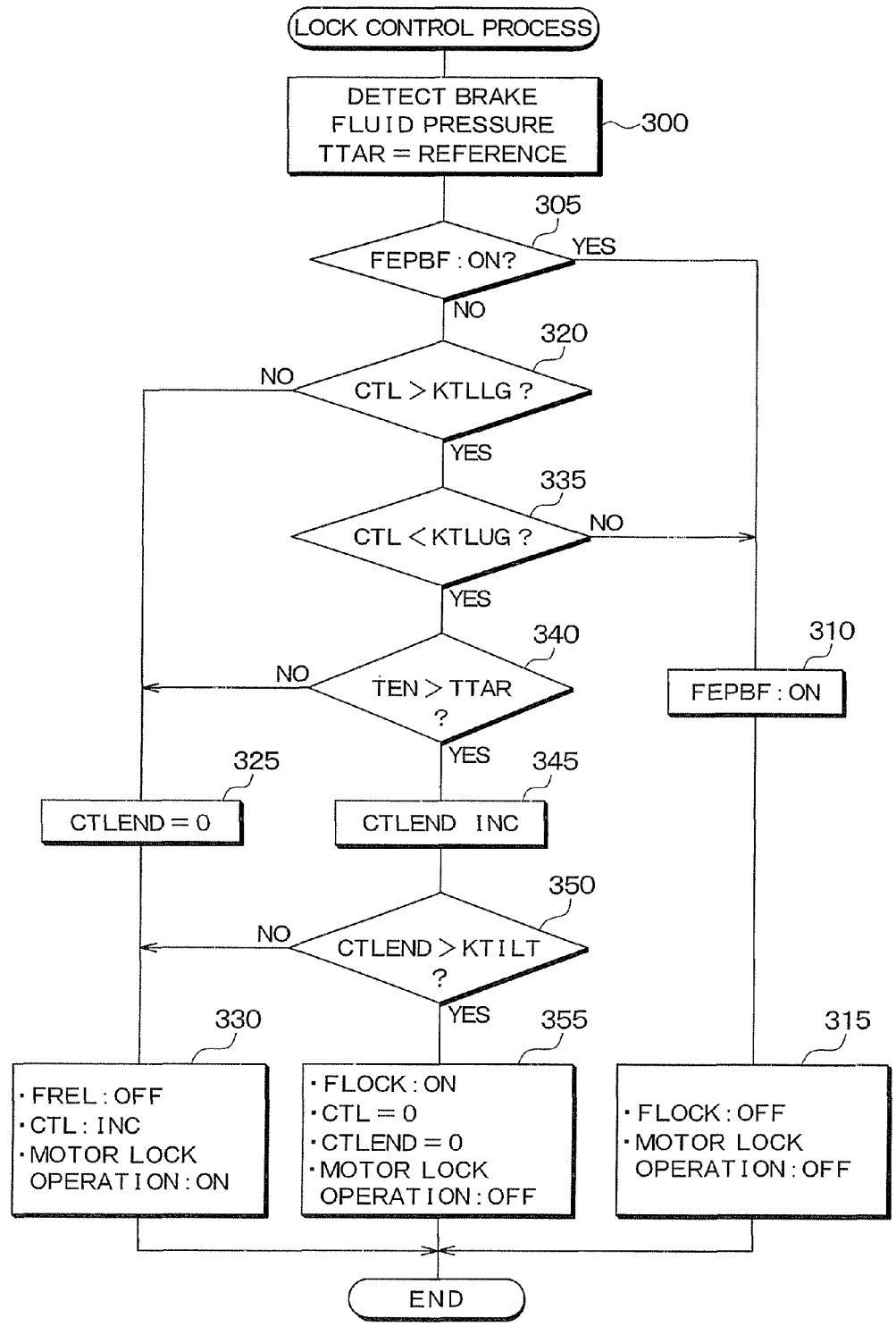
FIG. 5 is a flowchart showing details of a lock control process.

At the lock control process, the EPB-ECU 13 rotates the motor 11 to activate the EPB 2, stops the rotation of the motor 11 when the drive nut 10*d* reaches a position where a desired brake force is generated, and then keeps the motor stopped. FIG. 5 is a flowchart showing details of the lock control process. Hereinafter, the lock control process is described with reference to FIG. 5.

Figure 6:
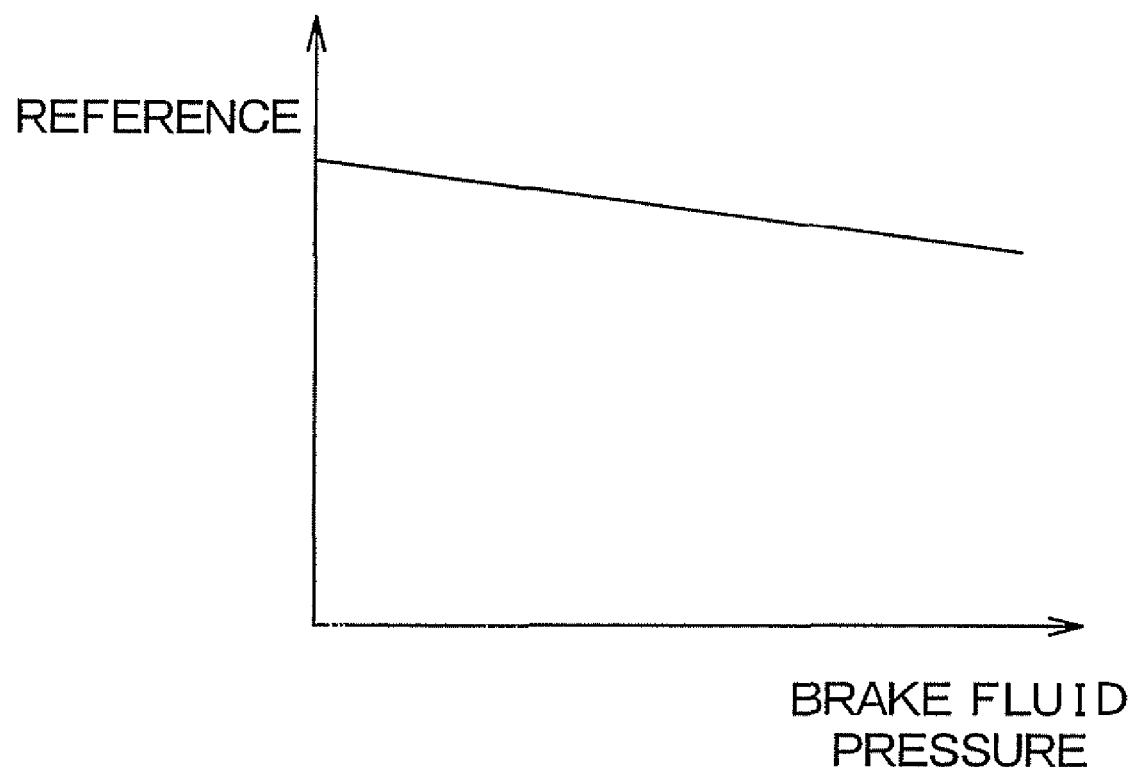
FIG. 6 is a map showing a relation between a brake fluid pressure and a reference value.

On starting the lock control process, the EPB-ECU 13 proceeds to step 300 to detect the brake fluid pressure (i.e. the M/C pressure), determine a reference value (i.e. a threshold) corresponding to the detected brake fluid pressure, and set a lock control target tension TTAR to the determined reference value. FIG. 6 is a map showing a relation between the brake fluid pressure and the reference value. When the brake fluid pressure is being generated, it is likely that the service brake 1 is operating and a detected tension value TEN is influenced by the service brake 1, wherein the detected tension value TEN is a tension which is applied to the brake cable 9 and detected by the tension sensor 30.

The reason why the detected tension value TEN is influenced by the service brake is as follows. In the built-in brake system 14, the nut 24 is used to move the piston 26 and press the brake pad 15 both in the case that the service brake 1 is activated and in the case that the EPB 2 is activated. When the release control of the EPB 2 is executed while the service brake 1 is operating, the nut 24 and the piston 26 are pressed toward the brake pad 15 by the W/C pressure. Therefore, the force applied from the push rod 23 to the ramp shaft 22 becomes smaller than in the case that the service brake 1 is not operating.

Therefore, as the pedaling force applied to the brake pedal 3 becomes larger, the W/C pressure becomes larger and the tension at the brake cable 9 necessary for generating a desired brake force of the EPB 2 becomes smaller. As a result, the reference value (i.e. lock control target tension TTAR) becomes smaller as the brake fluid pressure becomes larger.

Then the EPB-ECU 13 proceeds to step 305 to determine whether or not the EPB malfunction flag FEPBF is ON. If the determination is affirmative, some kind of malfunction is occurring. Therefore, if the determination is affirmative, the EPB-ECU 13 proceeds to step 310 to keep the EPB malfunction flag FEPBF at ON and then proceeds to step 315 to turn the lock state flag FLOCK to OFF and turn motor lock operation to OFF. Turning the motor lock operation to OFF is achieved by not driving the motor 11 or by stopping the motor 11. After step 315, the EPB-ECU 13 terminates the lock control process in the present control cycle. If the determination at step 305 is negative, the EPB-ECU 13 proceeds to step 320.

At step 320, the EPB-ECU 13 determines whether or not a lock control time counter CTL is larger than a predetermined minimum lock control time KTLLG. The lock control time counter CTL is a counter for measuring a time passed since the onset of the lock control and is therefore starts being counted up as soon as the lock control process is started. The minimum lock control time KTLLG is a minimum value in a range of a time period, wherein the duration of the lock control is expected to vary within the range. Therefore, the minimum lock control time KTLLG is predetermined depending on the length of the brake cable 9 and the rotational speed of the motor 11. As is described later, when the tension applied to the brake cable reaches the lock control target tension TTAR, the brake pedal 3 determines that the brake force generated by the tension at the brake cable 9 has reached a desired value. However, the brake force is unlikely to reach the desired value while the time passed since the onset of the lock control is smaller than the minimum lock control time KTLLG. Therefore, the lock control is automatically continued without determining whether or not the brake force generated by the tension at the brake cable 9 has reached the desired value while the lock control time counter CTL is not larger than the minimum lock control time KTLLG.

As described above, the lock control is continued while the lock control time counter CTL is not larger than the minimum lock control time KTLLG. In this case, the EPB-ECU 13 proceeds to step 325 to initialize a lock control termination timer CTLEND described later to zero. Then the EPB-ECU 13 proceeds to step 330 to turn a release state flag FREL to OFF, increase the lock control time counter CTL, and turn a motor lock operation to ON. By turning the motor lock operation to ON, the EPB-ECU 13 causes the motor 11 to rotate in the forward direction. Accordingly, the gear mechanism 10 is driven by the forward rotation of the motor 11 so that the drive nut 10*d* moves in the direction parallel to the axis of the output shaft 10*c* and the brake cable 9 is pulled to lock the EPB 2.

If the determination at step 320 is affirmative, the EPB-ECU 13 proceeds to step 335 to determine whether or not the lock control time counter CTL is smaller than a predetermined maximum lock control time KTLUG. The maximum lock control time KTLUG is a maximum value in a range of a time period, wherein the duration of the lock control is expected to vary within the range. Therefore, the maximum lock control time KTLUG is predetermined depending on the length of the brake cable 9 and the rotational speed of the motor 11. It is likely that some kind of malfunction is occurring if the lock control time counter CTL keeps increasing after the maximum lock control time KTLUG passes since the onset of the lock control. For example, this situation occurs when the gear mechanism 10 or the brake cable 9 is damaged and accordingly the tension of the brake cable 9 does not reach the lock control target tension TTAR for a long time. Therefore, if the determination at step 335 is negative, the EPB-ECU 13 proceeds to step 310 to turn the EPB malfunction flag FEPBF to ON and then proceeds to step 315. If the determination at step 335 is affirmative, the EPB-ECU 13 proceeds to step 340.

At step 340, the EPB-ECU 13 determines whether or not the detected tension value TEN is larger than the lock control target tension TTAR. The detected tension value TEN is a tension detected by the tension sensor 30 at the present control cycle. When the detected tension value TEN is smaller than the lock control target tension TTAR, that is, when the desired brake force is not generated by the tension at the brake cable 9, the EPB-ECU 13 proceeds to step 325 to set the lock control termination timer CTLEND to zero and then executes the processes at step 330.

When the detected tension value TEN reaches the lock control target tension TTAR, it is likely that the difference between the desired brake force and the actual brake force generated by the tension of the brake cable 9 becomes sufficiently small, that is, the friction surface of the brake pad 15 is pressed against the brake disc 16 with a sufficient force. Therefore, the EPB-ECU 13 proceeds to step 345 to increase the lock control termination timer CTLEND and then proceeds to step 350. At step 350, the EPB-ECU 13 determines whether or not the lock control termination timer CTLEND has reached a lock control termination time KTILT. In other words, the EPB-ECU 13 determines whether or not a predetermined time has passed since the difference between the target brake force and the brake force generated by the tension of the brake cable 9 becomes sufficiently small, wherein the predetermined time is a time period after which the desired brake force is supposed to be generated. When the determination at step 350 becomes affirmative, the EPB-ECU 13 proceeds to step 355.

At step 355, the EPB-ECU 13 turns on the lock state flag FLOCK for indicating the EPB 2 is completely locked, sets the lock control time counter CTL to zero, sets the lock control termination timer CTLEND to zero, and turns motor lock operation to OFF (i.e. stop the motor 11). Accordingly, the motor 11 stops rotating and the operation of the gear mechanism 10 is stopped. At this time, the friction force generated by the engagement between the output shaft 10c and the drive nut 10d keeps the brake cable 9 being pulled. Therefore, the generated brake force is maintained, and the movement of the vehicle is restricted. The lock control is then completed.

Figure 7:
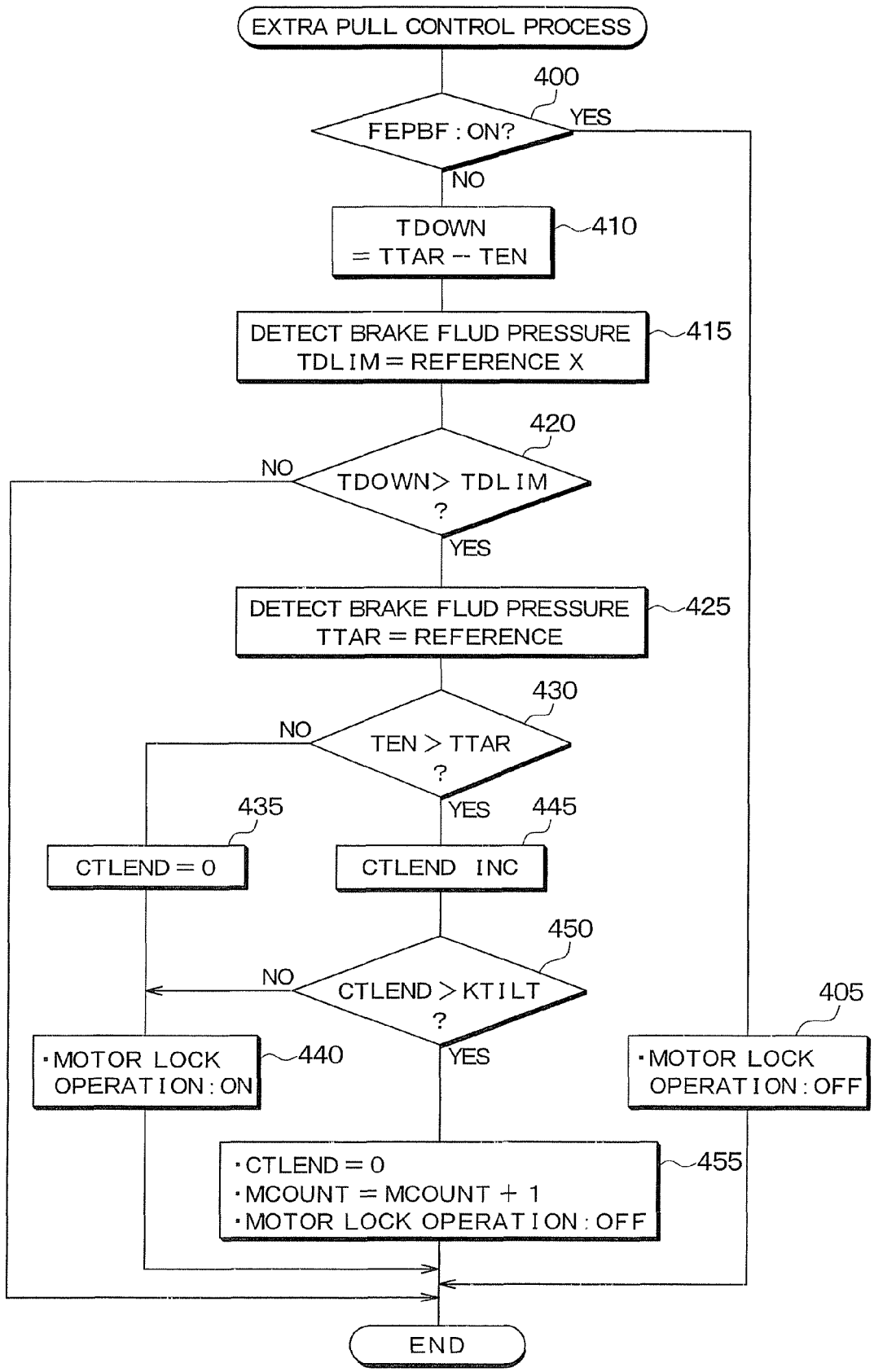
FIG. 7 is a flowchart showing details of an extra pull control process.

When the determination at step 140 in FIG. 3 becomes affirmative, the EPB-ECU 13 proceeds step 160 to execute the extra pull control process. FIG. 7 is a flowchart showing details of the extra pull control process. Hereinafter, the extra pull control process is described with reference to FIG. 7.

First, the EPB-ECU 13 determines at step 400 whether or not the EPB malfunction flag FEPBF is ON, wherein the EPB malfunction flag FEPBF is for indicating that the EPB 2 is in an extraordinary situation. When the determination is affirmative, the EPB-ECU 13 proceeds to step 405 to turn the motor lock operation to OFF so that the extra pull is not executed. If the determination at step 400 is negative, the EPB-ECU 13 proceeds to step 410.

At step 410, the EPB-ECU 13 calculates a tension decrease amount TDOWN which is a difference between the lock control target tension TTAR and the detected tension value TEN detected at the present control cycle. Since the extra pull control is executed after the EPB 2 is locked at the lock control, the lock control target tension TTAR is still set to a value which is determined in the lock control (see step 300 in FIG. 5). Therefore, the decrease amount TDOWN, which is calculated by subtracting the detected tension value TEN at the present time from this lock control target tension TTAR which is still remaining in a memory such as the RAM, serves as the decrease amount of the tension from the lock control target tension TTAR which is required in locking the EPB 2.

Figure 8:
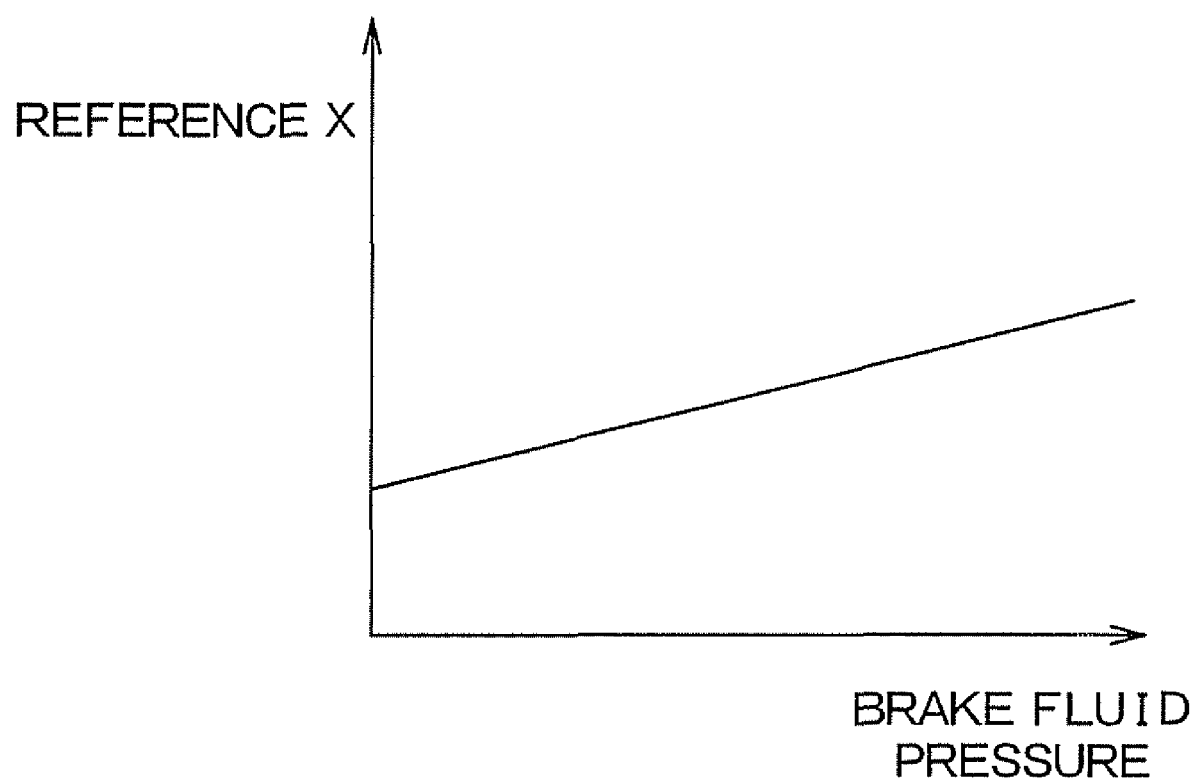
FIG. 8 is a map showing a relation between the brake fluid pressure and a reference X.

Then the EPB-ECU 13 proceeds to step 415 to detect the brake fluid pressure (i.e. the M/C pressure) and determine a reference X (a threshold) corresponding to the detected brake fluid pressure. Then the EPB-ECU 13 assigns the determined reference X to an extra pull permission reference TDLIM which is a threshold for determining whether or not the extra pull is executed. FIG. 8 is a map showing a relation between the brake fluid pressure and the reference X. When the brake fluid pressure is being generated, it is likely that the service brake 1 is operating and the detected tension value TEN is influenced by the service brake 1. As the pedaling force applied to the brake pedal 3 becomes larger, the W/C pressure becomes larger and the tension at the brake cable 9 necessary for generating a desired brake force of the EPB 2 becomes smaller. Therefore, the desired brake force of the EPB 2 may be achieved even in the case that the detected tension value TEN has decreased below the lock control target tension TTAR, if the service brake 1 is operating. Therefore, the map shown in FIG. 8 is designed by taking the decrease of the tension caused by the service brake 1 into account so that the reference X becomes smaller as the brake fluid pressure becomes larger.

Then, the EPB-ECU 13 proceeds to step 420 to determine whether or not the tension decrease amount TDOWN is larger than the extra pull permission reference TDLIM. If the determination at step 420 is negative, the extra pull is not necessary and the extra pull control process in the present control cycle is therefore terminated. If the determination at step 420 is affirmative, the extra pull is necessary and the EPB-ECU 13 proceeds to step 425.

At step 425, the EPB-ECU 13 detects, as is done at step 300 in FIG. 5, the brake fluid pressure and sets the lock control target tension TTAR to the reference value corresponding to the detected brake fluid pressure according to the map shown in FIG. 6. In other words, the EPB-ECU 13 detects the brake fluid pressure (the M/C pressure) at the time when it is determined that the extra pull is necessary, and determines again the lock control target tension T-TAR according to the degree of influence of the service brake 1 at this time.

Then, the EPB-ECU 13 proceeds to step 430 to determine, as is done at step 340 in the lock control process, whether or not the detected tension value TEN is larger than the lock control target tension TTAR. If the determination is negative, the EPB-ECU 13 proceeds to step 435 to set the lock control termination timer CTLEND to zero and then proceeds to step 440 to turn the motor lock operation to ON. By turning the motor lock operation to ON, the extra pull is executed.

After that, the determination at step 430 becomes affirmative when the extra pull increases the detected tension value TEN above the lock control target tension TTAR. In this case, the EPB-ECU 13 proceeds to step 445 to increase the lock control termination timer CTLEND and then proceeds to step 450. At step 450, the EPB-ECU 13 determines whether or not the lock control termination timer CTLEND reaches the lock control termination time KTILT. Above processes are executed until the determination at step 450 becomes affirmative. When the determination at step 450 becomes affirmative, the EPB-ECU 13 proceeds to step 455 to set the lock control termination timer CTLEND to zero, increase the extra pull number counter MCOUNT by one, and stop the motor lock operation. At this time, the friction force generated by the engagement between the output shaft 10c and the drive nut 10d keeps the brake cable 9 being pulled. Therefore, the generated brake force is maintained, and the movement of the vehicle is restricted. The extra pull control is then completed.

If the determination at step 130 in FIG. 3 becomes negative, the EPB-ECU 13 proceeds step 180 to determine whether or not the release state flag FREL. The release state flag FREL is a flag which is turned to ON when the EPB 2 is driven and released, that is, when the brake force caused by the EPB 2 is removed. Therefore, the operation of the EPB 2 is completed and the brake force has been removed when the release state flag FREL is ON. Therefore, the EPB-ECU 13 proceeds to step 190 to execute a release control process only when the determination at step 180 is negative. When the determination at step 180 is affirmative, the EPB-ECU 13 proceeds to step 170 since it is likely that the release control process has been finished.

Figure 9:
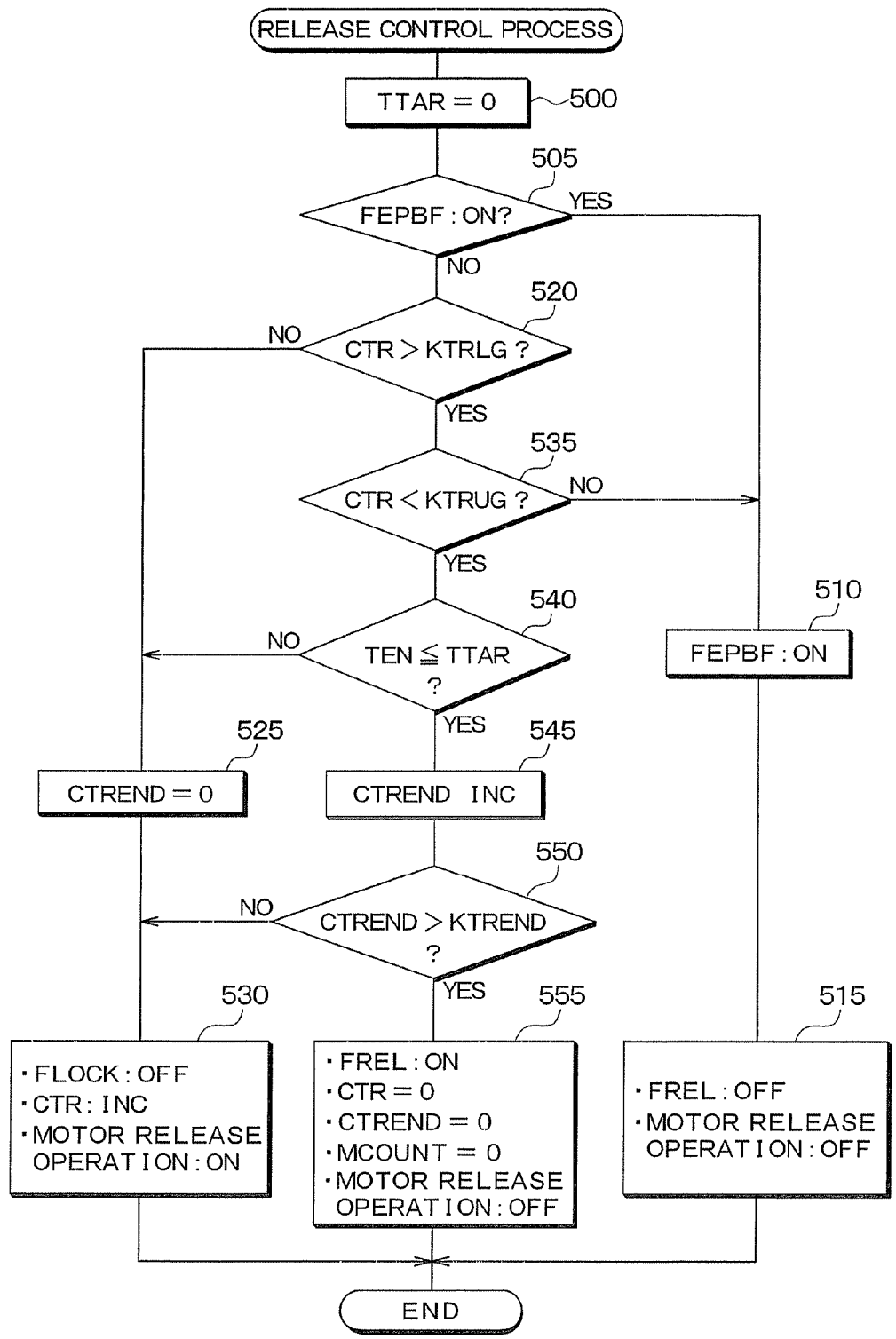
FIG. 9 is a flowchart showing details of a release control process.

In the release control process, the EPB-ECU 13 drives the EPB 2 by rotating the motor 11 so as to remove the brake force generated by the parking brake mechanism. FIG. 9 is a flowchart showing details of the release control process. Hereinafter, the release control process is described with reference to FIG. 9.

On starting the release control process, the EPB-ECU 13 sets the lock control target tension TTAR to zero at step 500. Then the EPB-ECU 13 proceeds to step 505 to determine whether or not the EPB malfunction flag FEPBF is ON. If the determination is affirmative, it is likely that some kind of malfunction is occurring and the EPB-ECU 13 therefore proceeds to step 510 to keep the EPB malfunction flag FEPBF on. Then the EPB-ECU 13 proceeds to step 515 to turn the release state flag FREL to OFF and turn the motor release operation to OFF. By turning the motor release operation to OFF, the EPB-ECU 13 stops rotating the motor 11 or keeps the motor 11 stopped. On the other hand, the EPB-ECU 13 proceeds to step 520 if the determination at step 505 is negative.

At step 520, the EPB-ECU 13 determines whether or not a release control time counter CTR is larger than a predetermined minimum release control time KTRLG. The release control time counter CTR is a counter for measuring a time passed since the onset of the release control and is therefore starts being counted up as soon as the release control is started. The minimum release control time KTRLG is a minimum value in a range of a time period, wherein the duration of the release control is expected to vary within the range. Therefore, the minimum release control time KTRLG corresponds to the minimum lock control time KTLLG and is also predetermined depending on the length of the brake cable 9 and the rotational speed of the motor 11. The time to take until the release of the EPB 2 is completed does not vary in a wide range in the transition of the EPB 2 from the locked state to the released state. Therefore, the EPB-ECU 13 is designed so that it determines the release of the EPB 2 is not completed whenever the release control time counter CTR is smaller than the minimum lock control time KTRLG. Thus, an erroneous determination which causes the termination of the release control at an early stage of the release control is prevented.

As described above, the release control is continued while the release control time counter CTR is not larger than the minimum release control time KTRLG. In this case, the EPB-ECU 13 proceeds to step 525 to initialize a release control termination timer CTREND described later to zero. Then the EPB-ECU 13 proceeds to step 530 to turn the lock state flag FLOCK to OFF, increase the release control time counter CTR, and turn the motor release operation to ON. By turning the motor release operation to ON, the EPB-ECU 13 causes the motor 11 rotate in the reverse direction. Accordingly, the gear mechanism 10 is driven by the forward rotation of the motor 11 so that the drive nut 10d moves in the direction parallel to the axis of the output shaft 10c and the brake cable 9 is returned to a release side at which the tension of the brake cable 9 is decreased.

If the determination at step 520 is affirmative, the EPB-ECU 13 proceeds to step 535 to determine whether or not the release control time counter CTR is smaller than a predetermined maximum release control time KTRUG. The maximum release control time KTRUG is a maximum value in a range of a time period, wherein the duration of the release control is expected to vary within the range. Therefore, the maximum lock control time KTRUG corresponds to the maximum lock control time KTLUG and is also predetermined depending on the length of the brake cable 9 and the rotational speed of the motor 11.

It is likely that some kind of malfunction is occurring if the release control time counter CTR keeps increasing after the maximum release control time KTRUG passes since the onset of the release control. For example, this situation occurs when the gear mechanism 10 or the brake cable 9 is damaged. Therefore, if the determination at step 535 is negative, the EPB-ECU 13 proceeds to step 510 to turn the EPB malfunction flag FEPBF to ON and then proceeds to step 515. If the determination at step 535 is affirmative, the EPB-ECU 13 proceeds to step 540.

At step 540, the EPB-ECU 13 determines whether or not the detected tension value TEN at the present control cycle is equal to or smaller than the lock control target tension TTAR. In other words, the EPB-ECU 13 determines whether or not the brake force is removed. If the determination is affirmative, the EPB-ECU 13 proceeds to step 545 to increase the release control termination timer CTREND. Then the EPB-ECU 13 proceeds to step 545 to increase the release control termination timer CTREND and then proceeds to step 550. At step 550, the EPB-ECU 13 determines whether or not the release control termination timer CTREND has reached a release control termination time KTREND. In other words, the EPB-ECU 13 determines whether or not a desired time has passed since the brake force is removed, wherein the desired time is a time period after which a clearance sufficient as a backlash is attained between the friction surface of the brake pad 15 and the surface of the brake disc 16. When the determination at step 550 becomes affirmative, the EPB-ECU 13 proceeds to step 555.

At step 555, the EPB-ECU 13 turns on the release state flag FREL for indicating the EPB 2 is completely released, sets the release control time counter CTR to zero, sets the release control termination timer CTREND to zero, turns the extra pull number counter MCOUNT to zero, and turns motor release operation to OFF (i.e. stop the motor 11). Accordingly, the motor 11 stops rotating and the operation of the gear mechanism 10 is stopped. At this time, the friction force generated by the engagement between the output shaft 10c and the drive nut 10d keeps the brake cable 9 loosened. The release control is then completed.

Figure 10:
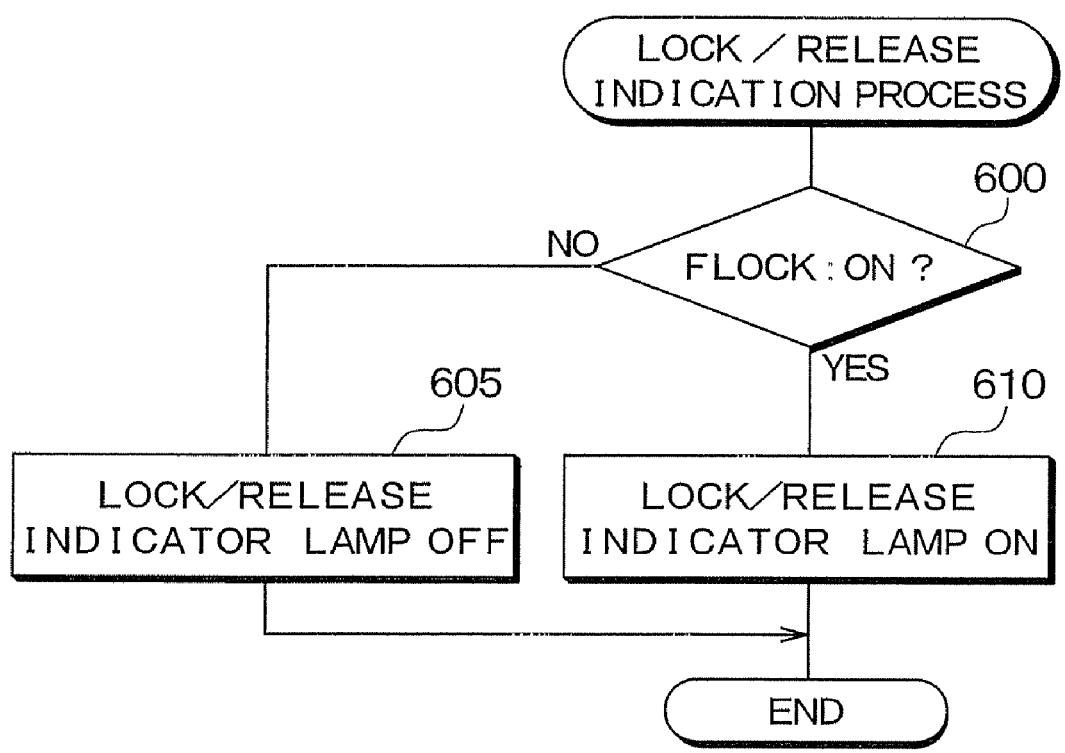
FIG. 10 is a flowchart showing a lock/release indication process.

When the lock control process or the release control process is terminated as described above, the EPB-ECU 13 proceeds to step 170 in FIG. 3 to execute a lock/release indication process. FIG. 10 is a flowchart showing the lock/release indication process. Hereinafter the lock/release indication process is described with reference to FIG. 10.

At step 600, the EPB-ECU 13 determines whether or not the lock state flag FLOCK is on. If the determination is negative, the EPB-ECU 13 proceeds to step 605 to turn off the lock/release indicator lamp 33. If the determination is affirmative, the EPB-ECU 13 proceeds to step 610 to turn on the lock/release indicator lamp 33. Thus, the EPB-ECU 13 turns on the lock/release indicator lamp 33 if the EPB 2 is in the lock state, and the EPB-ECU 13 turns off the lock/release indicator lamp 33 if the EPB 2 is in the release state or the release control has started. Therefore, it is possible to make the driver recognize whether or not the EPB 2 is in the lock state. Thus, the lock/release indication process is completed and the parking brake control is also completed.

As described above, the EPB-ECU 13 in the present embodiment sets the lock control target tension TTAR to a value which depends on the brake fluid pressure (i.e. M/C pressure), wherein the lock control target tension TTAR is used as a threshold determining whether the condition for terminating the lock control is satisfied or not. This operation is aimed for compensating the decrease of the tension applied to the brake cable 9 which occurs caused by the service brake 1 when the service brake 1 is operating and does not occur when the service brake 1 is not operating. Therefore, it is possible to prevent the service brake 1 from causing a problem in which the lock control is terminated while the brake force of the EPB 2 is not a desired value.

In addition, the EPB-ECU 13 in the present embodiment sets the extra pull permission reference TDLIM to a value which depends on the brake fluid pressure (i.e. M/C pressure), wherein the an extra pull permission reference TDLIM is used as a threshold determining whether or not the extra pull control is executed. This operation is aimed for compensating the decrease of the tension applied to the brake cable 9 which occurs caused by the service brake 1 when the service brake 1 is operating and does not occur when the service brake 1 is not operating. Therefore, it is possible to prevent the service brake 1 from causing a problem in which the extra pull control is executed even if the extra pull operation is unnecessary.

Other Embodiments (1) In the above embodiment, information related to the M/C pressure is inputted from the ESC-ECU 8 to the EPB-ECU 13. However, another signal by means of which the status of operation of the service brake 1 can be detected may be inputted to the EPB-ECU 13 directly or through the ESC-ECU 8. Such signal may be, for example, a detection signal from a pedaling force sensor for detecting a force applied to the brake pedal by the driver's foot or a detection signal from a stroke sensor for detecting how far the brake pedal is pressed.

(2) In the above embodiment, the lock control target tension TTAR is determined so that it becomes smaller as the brake fluid pressure becomes larger while the service brake 1 is operating. However, the lock control target tension TTAR may be set to a value which is unchanged while the service brake 1 is operating. The lock control target tension TTAR can be any value if it becomes smaller in the case that the service brake 1 is operating than in the case that the service brake 1 is not operating.

In addition, the extra pull permission reference TDLIM is determined so that is becomes larger as the brake fluid pressure becomes larger while the service brake 1 is operating. However, the extra pull permission reference TDLIM may be set to a value which is unchanged while the service brake 1 is operating. The extra pull permission reference TDLIM can be any value if it becomes larger in the case the service brake 1 is operating than in the case that the service brake 1 is not operating.

The EPB-ECU 13 may determine whether or not the service brake 1 is operating based on any physical quantity if the physical quantity reflects the status of operation of the service brake 1—i.e. the status of operation of the brake pedal 3. For example, the determination may be done based on a detection signal from a pedaling force sensor or a detection signal from a stroke sensor, as described above.

(3) In the above embodiment, the EPB 2 is a disc brake. However, the EPB 2 may be a drum brake. In the drum brake, the brake force is generated when a motor operates to adjust the wheel cylinder pressure so that friction surfaces of brake shoes serving as a first friction material (or, a first friction member) is pressed against the inner wall surface of a brake drum serving as a second frictional material (or, second friction member).

In the above embodiment, the brake force is generated when the motor 11 operates to pull the brake cable 9. However, the brake force may be generated by any brake system if the motor 11 generates a pressing force corresponding to a pressing force for moving the first friction material (or, the first friction member) in the brake system. For example, a brake system may be used in which the brake force is generated when the motor 11 operates to press a hydraulic piston so as to increase the hydraulic pressure.

In the above embodiment, the extra pull control is described in which the degree of pulling of the brake cable 9 is set to be larger than that in the lock control so as to adjust the brake force and accordingly maintain the locked state of the EPB 2. It should be noted that the extra pull control is just an example of an adjustment control for adjusting the brake force generated by the EPB 2 again. In a brake system which does not use the brake cable 9, another example of the adjustment control can be used in which a pressing force corresponding to a pressing force for moving a friction material is adjusted to achieve an effect similar to that in the extra pull control.

(4) In the above embodiment, when the EPB 2 generates the brake force, the tension applied to the brake cable 9 is used to detect the pressing force for moving the brake pad 15 which serves as a first friction material (first friction member). However, the pressing force may be detected by using another method. For example, a load which the ramp shaft 22 applies to the push rod 23 or a rotation angle of the caliper lever 18 may be used as a quantity corresponding to the pressing force. They can be detected by means of a load sensor or a rotational angle sensor. In the above embodiment, zero tension is used as a target value at which the brake force caused by the EPB 2 is supposed to be removed. However, another value may be used as the target value depending on what quantity is used as a physical quantity corresponding to the pressing force.

(5) Each of the steps shown in the figures serves as a section for executing the corresponding process. For example, a section of the EPB-ECU 13 which executes the lock control process at step 150 serves as a lock control section. A section of the EPB-ECU 13 which determines the lock control target tension TTAR at step 300 serves as a target value determination section. A section of the EPB-ECU 13 which executes the extra pull control at step 160 serves as an adjustment control section. A section of the EPB-ECU 13 which executes for determining the extra pull permission reference TDLIM serves as a threshold determination section.

What is claimed is:

1. A parking brake control device for executing a parking brake control by using a brake system including an electric parking brake and a service brake, the electric parking brake generating a parking pressing force for moving a first friction material toward a second friction material by rotating an electric motor in a first direction, the electric parking brake accordingly generating a brake force by using friction between the first friction material and the second friction material, the service brake operating based on operation to a brake pedal and generating a brake force by moving the first friction material to the second friction material, the parking brake control device comprising:

a lock control section for executing a lock control, the lock control being for:
  generating the brake force by rotating the electric motor in the first direction and by accordingly generating the parking pressing force;
  after the generating of the brake force by rotating the electric motor in the first direction, stopping the rotation of the motor when a termination condition is satisfied wherein the termination condition is that the parking pressing force reaches a target value for stopping the rotation of the motor; and
  maintaining, after the stopping, the brake force to keep the electric parking brake locked; and a release control section for executing a release control for releasing the brake force generated by the lock control section, wherein the lock control section includes a target determination section for determining the target value so that the target value becomes smaller in the case that the service brake is operating than in the case that the service brake is not operating.

2. The parking brake control device according to claim 1 wherein the target determination section detects, in determining the target value, a physical quantity corresponding to the parking pressing force for moving the first friction material toward the second friction material and determines the target value so that the target value becomes smaller as the physical quantity becomes larger.

3. The parking brake control device according to claim 2 wherein the target determination section uses a brake fluid pressure as the physical quantity corresponding to the parking pressing force for moving the first friction material toward the second friction material.

4. The parking brake control device according to claim 3, further comprising an adjustment control section for:
calculating, while the electric parking brake is being locked by the lock control section, decrease of the parking pressing force from the target value and increase the parking pressing force by rotating the electric motor in the first direction when the calculated decrease becomes larger than a threshold,
wherein the adjustment control section includes a threshold determination section for determining the threshold so that the threshold becomes larger in the case that the service brake is operating than in the case that the service brake is not operating.

5. The parking brake control device according to claim 4 wherein the threshold determination section detects, in determining the threshold, a physical quantity corresponding to the parking pressing force for moving the first friction material toward the second friction material and determines the target value so that the threshold becomes larger as the physical quantity becomes larger.

6. The parking brake control device according to claim 4 wherein the threshold determination section uses a brake fluid pressure as the physical quantity corresponding to the parking pressing force for moving the first friction material toward the second friction material.

7. The parking brake control device according to claim 2, further comprising an adjustment control section for:
calculating, while the electric parking brake is being locked by the lock control section, decrease of the parking pressing force from the target value and increase the parking pressing force by rotating the electric motor in the first direction when the calculated decrease becomes larger than a threshold,
wherein the adjustment control section includes a threshold determination section for determining the threshold so that the threshold becomes larger in the case that the service brake is operating than in the case that the service brake is not operating.

8. The parking brake control device according to claim 7 wherein the threshold determination section detects, in determining the threshold, a physical quantity corresponding to the parking pressing force for moving the first friction material toward the second friction material and determines the target value so that the threshold becomes larger as the physical quantity becomes larger.

9. The parking brake control device according to claim 7 wherein the threshold determination section uses a brake fluid pressure as the physical quantity corresponding to the parking pressing force for moving the first friction material toward the second friction material.

10. The parking brake control device according to claim 1, further comprising an adjustment control section for:
calculating, while the electric parking brake is being locked by the lock control section, decrease of the parking pressing force from the target value and increase the parking pressing force by rotating the electric motor in the first direction when the calculated decrease becomes larger than a threshold,
wherein the adjustment control section includes a threshold determination section for determining the threshold so that the threshold becomes larger in the case that the service brake is operating than in the case that the service brake is not operating.

11. The parking brake control device according to claim 10 wherein the threshold determination section detects, in determining the threshold, a physical quantity corresponding to the parking pressing force for moving the first friction material toward the second friction material and determines the target value so that the threshold becomes larger as the physical quantity becomes larger.

12. The parking brake control device according to claim 10 wherein the threshold determination section uses a brake fluid pressure as the physical quantity corresponding to the parking pressing force for moving the first friction material toward the second friction material.

13. A parking brake control device for executing a parking brake control by using a brake system including an electric parking brake and a service brake, the electric parking brake generating a pressing force for moving a first friction material toward a second friction material by rotating an electric motor in a first direction, the electric parking brake accordingly generating a brake force by using friction between the first friction material and the second friction material, the service brake operating based on operation to a brake pedal and generating a brake force by moving the first friction material to the second friction material, the parking brake control device comprising:
a lock control section for executing a lock control, the lock control being for:
generating the brake force by rotating the electric motor in the first direction and by accordingly generating the pressing force;
then stopping the rotation of the motor when a termination condition is satisfied wherein the termination condition is that the pressing force reaches a target value for stopping the rotation of the motor; and
then maintaining the brake force to keep the electric parking brake locked; and
an adjustment control section for:
calculating, while the electric parking brake is being locked by the lock control section, decrease of the pressing force from the target value and increase the pressing force by rotating the electric motor in the first direction when the calculated decrease becomes larger than a threshold,
wherein the adjustment control section includes a threshold determination section for determining the threshold so that the threshold becomes larger in the case that the service brake is operating than in the case that the service brake is not operating.

14. The parking brake control device according to claim 13 wherein the threshold determination section detects, in determining the threshold, a physical quantity corresponding to the pressing force for moving the first friction material toward the second friction material and determines the target value so that the threshold becomes larger as the physical quantity becomes larger.

15. The parking brake control device according to claim 13 wherein the threshold determination section uses a brake fluid pressure as the physical quantity corresponding to the pressing force for moving the first friction material toward the second friction material.

* * * * *